United States Patent [19]

Spinnler

[11] Patent Number: 5,402,765
[45] Date of Patent: Apr. 4, 1995

[54] INTERNAL COMBUSTION ENGINE WITH A CHARGER IN ACCORDANCE WITH THE PRINCIPLE OF POSITIVE DISPLACEMENT

[75] Inventor: Fritz Spinnler, Mellingen, Switzerland

[73] Assignee: Aginfor AG fur industrielle Forschung, Wettingen, Switzerland

[21] Appl. No.: 214,200

[22] Filed: Mar. 17, 1994

[30] Foreign Application Priority Data

Mar. 17, 1993 [CH] Switzerland .................. 00808/93

[51] Int. Cl.⁶ .......................................... F02B 33/00
[52] U.S. Cl. ................................................ 123/559.1
[58] Field of Search ................ 123/559.1; 418/55.3, 418/151

[56] References Cited

U.S. PATENT DOCUMENTS 3,989,422 11/1976 Guttinger ............................ 418/55
5,033,945 7/1991 Kolb .................................. 418/55.3

FOREIGN PATENT DOCUMENTS 354342 7/1989 European Pat. Off. .
3922172 1/1991 Germany ........................... 123/559.1
0225720 10/1987 Japan ................................ 123/559.1

Primary Examiner—Richard A. Bertsch
Assistant Examiner—Charles Freay
Attorney, Agent, or Firm—Burns, Doane, Swecker & Mathis

[57] ABSTRACT

In a reciprocating internal combustion engine with a mechanically-driven charger (20), the number and disposition of cylinders of the internal combustion engine is such that free forces/moments of inertia are still provided. At least one shaft of the mechanical charger is disposed parallel to the crankshaft of the reciprocating internal combustion engine. The mechanical charger (20) is driven in an angle-synchronous manner with the crankshaft (32) of the reciprocating internal combustion engine. The transmission ratio between the charger and the crankshaft is in whole numbers. The charger (20) has a balancing centrifugal weight on at least one of its shafts which during operation counteracts the free forces of inertia of the reciprocating internal combustion engine for the purpose of a low-vibration or vibration-free operation of the internal combustion engine.

3 Claims, 3 Drawing Sheets

INTERNAL COMBUSTION ENGINE WITH A CHARGER IN ACCORDANCE WITH THE PRINCIPLE OF POSITIVE DISPLACEMENT

FIELD OF THE INVENTION

The invention relates to a reciprocating internal combustion engine with a mechanically-driven charger, the number and disposition of cylinders of which is such that free forces/moments of inertia are still provided, and wherein a shaft of the mechanical charger is disposed parallel to the crankshaft of the reciprocating internal combustion engine.

BACKGROUND OF THE INVENTION

When employing an internal combustion engine in an automobile, charging of internal combustion engines by means of a charger driven by the crankshaft is useful when, for reasons of fuel consumption, it is intended to attain a predetermined output goal in stationary as well as mobile operations, which cannot be attained if the internal combustion engine is operated purely under atmospheric pressure. If operated only as an aspirating engine, the size of the internal combustion engine is not sufficient. However, an internal combustion engine of this size has the advantage that it is possible to operate under partial load, which is often used in the course of operating an automobile, to achieve better utilization of fuel, instead of using a larger internal combustion engine which does not require charging to achieve the required full load values.

Most often internal combustion engines for automotive purposes are embodied as reciprocating engines with several cylinders. For reasons of quiet running, the number and placement of the cylinders is selected such that balancing of the forces of inertia is possible. The free forces of inertia are generated by the kinematics of the piston movement which are determined by the geometry of the crank drive. It is known that the number of six cylinders disposed in-line permits complete balancing of the forces of inertia during four-stroke operation. For four-cylinder engines with cylinders disposed in-line, balancing shafts with centrifugal weights are required to balance the free forces of inertia, if vibration-free running of the internal combustion engine is to be achieved.

As already mentioned, for reasons of efficient fuel consumption it is advantageous to utilize for automotive purposes internal combustion engines with a small working volume and to equip them with a charger driven by the crankshaft of the internal combustion engine to achieve the required output goal. As a rule, internal combustion engines with a small working volume also have a smaller number of cylinders than those with a large working volume. Balancing of the free forces of inertia becomes more important with small internal combustion engines with four or fewer cylinders.

Charging of internal combustion engines by means of a positive displacement charger driven by the crankshaft is known from the state of the art. The positive displacement machine can be of the spiral construction type. Such a machine is known from German Patent Publication DE-C3-2 603 462, for example. A charger constructed in accordance with this principle is distinguished by an almost pulsation-free conveying of air or of a gaseous working medium consisting of air and fuel and is particularly suited for charging of internal combustion engines.

The charger is driven by the crankshaft of the internal combustion engine. The charger itself consists of a housing with spiral-shaped conveying chambers disposed therein and of a positive displacement body associated with these conveying chambers, which is fastened on a rotor which can be driven eccentrically in respect to the housing in such a way that during operation each one of its points performs a circular motion, which is limited by the circumferential walls of the positive displacement chamber. An eccentric disk is disposed on the driveshaft for this purpose and has associated counterweights for balancing of the centrifugal forces of the eccentric disk and of the rotor guide by it, generated by the eccentric movement.

A spiral machine is known from European Patent Publication EP 354 342. With this machine, as well as with all other known spiral positive displacement devices wherein a device, for example in the form of a guide shaft operating synchronously with the driveshaft of the rotor, is provided for the translatory guidance of the rotor, balancing of the centrifugal forces generated by the eccentric disk and by the rotor is performed by counterweights fastened on the driveshaft.

As a rule, the charger is driven via a belt drive with a defined transmission ratio in respect to the crankshaft of the internal combustion engine. In the case of a spiral machine, the rpm of the charger are greater by a factor of approximately 1.5 to 2.5 than those of the internal combustion engine.

OBJECT AND SUMMARY OF THE INVENTION

It is an object of the invention to alter the kinematics of a charger of the positive displacement type in such a way that it causes balancing of the free forces of inertia of the internal combustion engine.

This object is attained in accordance with the invention in that the mechanical charger is driven in an angle-synchronous manner with the crankshaft of the reciprocating internal combustion engine, that the transmission ratio between the charger and the crankshaft is in whole numbers, and that the charger has a balancing centrifugal weight on at least one of its shafts which during operation counteracts the free forces of inertia of the reciprocating internal combustion engine for the purpose of a low- vibration or vibration-free operation of the internal combustion engine.

It is particularly useful if the mechanical charger is a spiral charger, the main or drive shaft of which, together with the eccentric disk and the rotor, constitutes the balancing centrifugal weight to act against the free forces/moments of inertia of the reciprocating internal combustion engine.

A spiral charger operating in accordance with the initially mentioned spiral principle is of particular importance because it has a driveshaft which is provided with centrifugal weights. To balance the free forces (and moments) of inertia, the driveshaft of the charger must be driven synchronously with the drive of the internal combustion engine and the transmission ratio must have a whole-number relationship with the crankshaft of the internal combustion engine. The customary balance weights of the charger operating in accordance with the spiral principle cause the vibration-free running of the charger itself. In accordance with the omission in accordance with the invention of these counterweights, the charger itself generates free forces of inertia which, because of the synchronization of the position of the angle of rotation of the driveshaft of the charger in respect to the crankshaft of the internal combustion engine, counteract the free forces of inertia of the internal combustion engine in such a way that they cancel them out.

The initially mentioned spiral machine has, besides the driveshaft, also a guide shaft which itself is guided in an angle-synchronous manner with the driveshaft, for example by means of a toothed belt drive.

An additional object of the invention consists in that in the course of synchronization of the charger crankshaft with the crankshaft of the internal combustion engine, for example by means of a toothed belt drive which also transmits the drive output required by the charger, the guide shaft is also tied into this synchronous belt drive. Because of this the separate synchronous drive between the charger driveshaft and its guide shaft can be omitted. Thus, the functions of the charger drive as well as its synchronization with the crankshaft of the internal combustion engine and the guide shaft are performed by means of only one machine element, which may be a toothed belt, for example.

An exemplary embodiment of the invention is schematically illustrated in the drawings.

DETAILED DESCRIPTION OF THE PREFERRED EMBODIMENT

The mode of operation of the charger, which is not an object of the invention, is not explained below. Only the structure of the machine and the course of the process will be briefly described in what follows.

Figure 1:
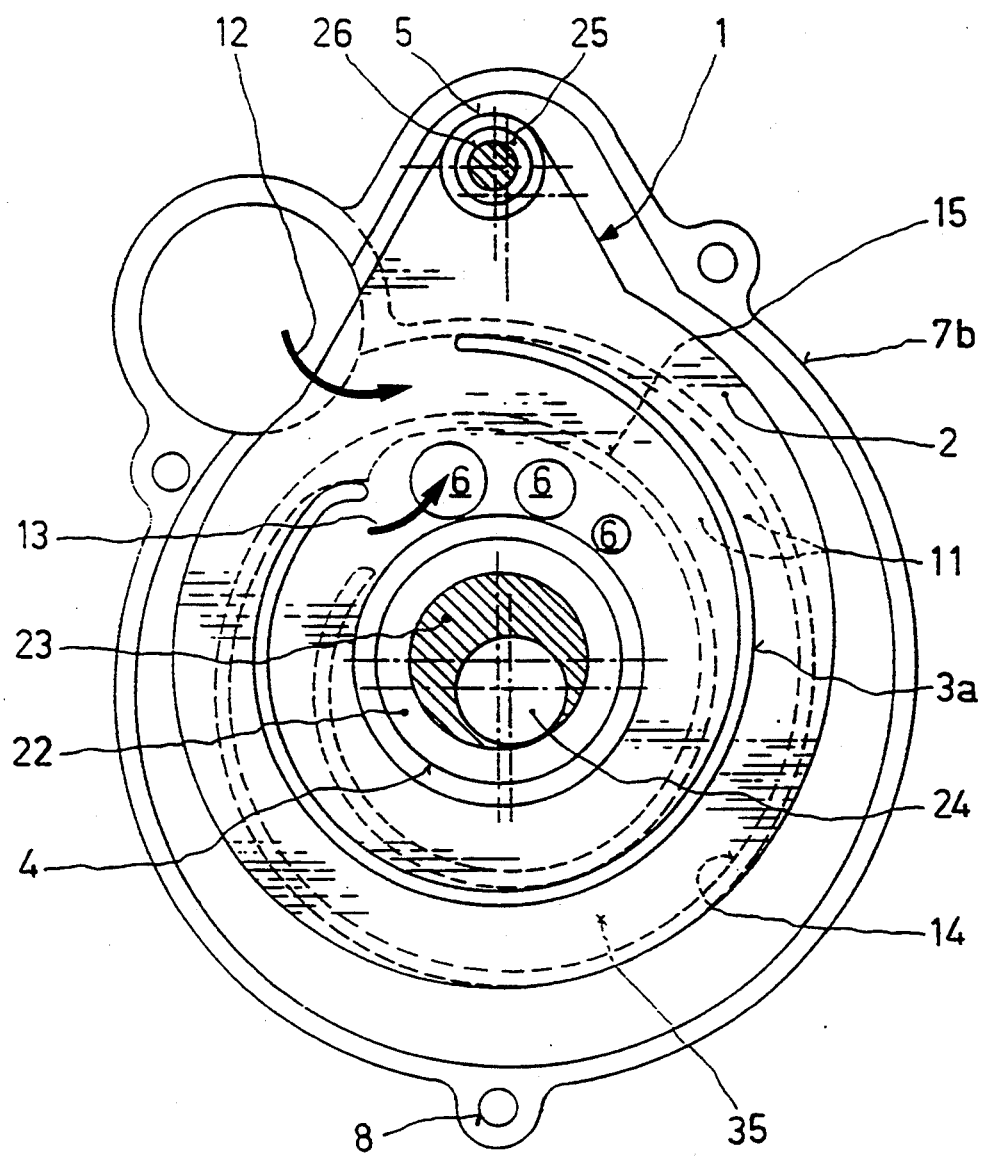
FIG. 1 is a cross-sectional view of a charger in accordance with the present invention.
Figure 2:
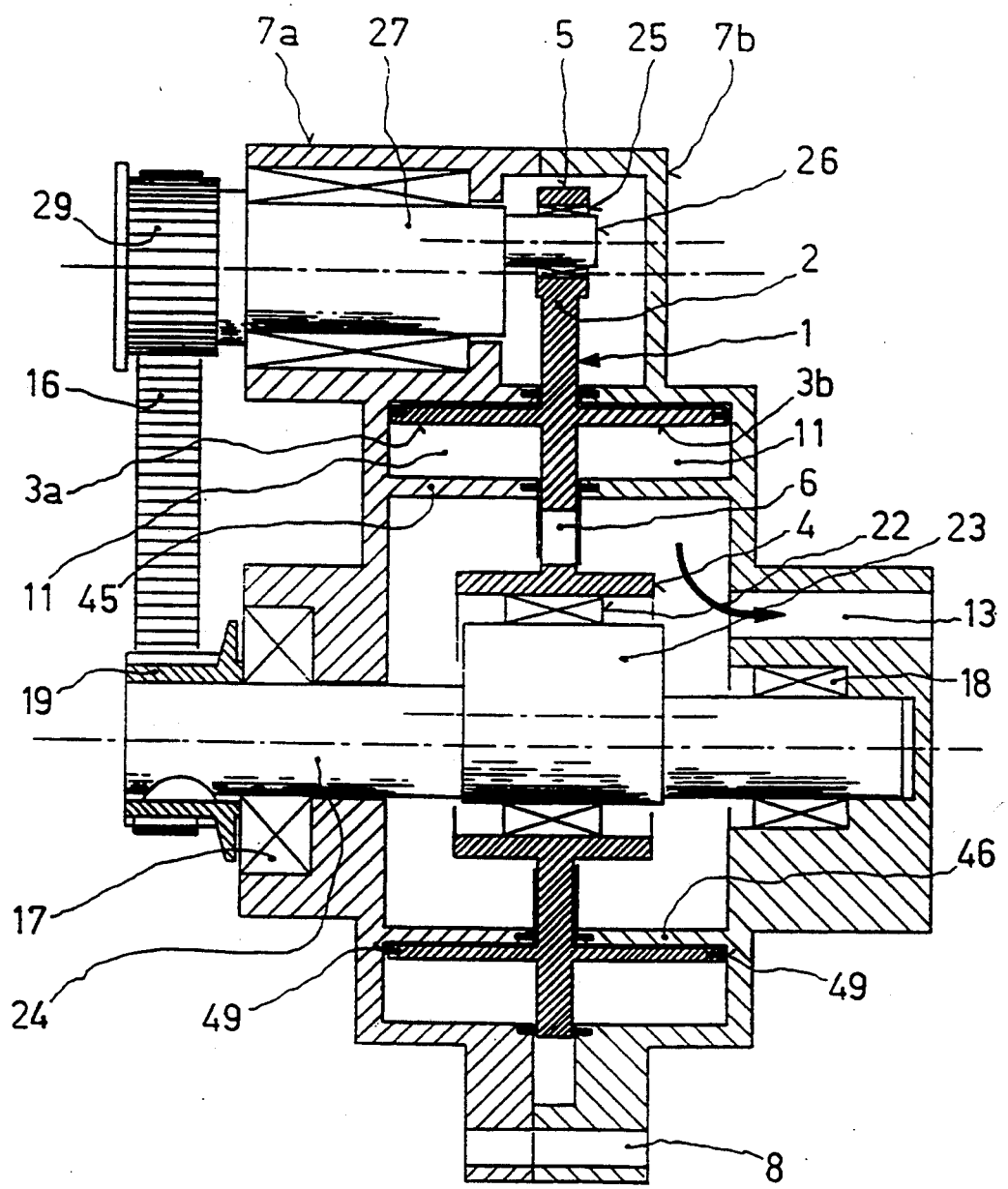
FIG. 2 is a longitudinal section through the charger with the driveshaft embodied in accordance with the invention.

The housing half 7b with the conveying chamber 11 and the inserted positive displacement device is illustrated in FIG. 1. The rotor of the machine as a whole is identified by 1. One spiral-shaped positive displacement body is respectively disposed in a mirror-inverted manner on both sides of the disk 2. These are the strips 3a, 3b, which are supported vertically on the disk 2 (FIGS. 1, 2). In the exemplary embodiment shown, the spiral itself is formed of a plurality of circles connected to each other. The hub is identified by 4, and the disk 2 is seated by means of it via a bearing 22 on an eccentric disk 23. The eccentric disk 23 itself is a part of the driveshaft 24.

An eye 5 for receiving a guide bearing 25 placed on an eccentric bolt 26 is disposed outside of the strips 3a, 3b. The bolt itself is a part of a guide shaft 27 (FIGS. 1, 2). Passages 6 are disposed at the spiral end in the disk, so that the medium can flow from one side of the disk to the other, for example for the purpose of being drawn off in a central outlet 13 disposed on only one side.

In FIG. 1, the housing half 7b of the machine housing is shown. The machine housing consists of two halves 7a, 7b connected with each other via fastening eyes 8 for the reception of screws, which is shown in FIG. 2. The conveying chamber is designated by 11 and is worked into the two housing halves in the form of a spiral-shaped slit. This slit extends from an inlet 12, disposed on the exterior circumference of the spiral in the housing, to an outlet 13 provided in the interior of the housing. Essentially it has parallel cylinder walls 14, 15, disposed at an even distance from each other which, in the present case, include a spiral of approximately 360°, the same as the positive displacement bodies of the disk 2. The positive displacement body consisting of the strips 3a, 3b acts between these cylinder walls, and its curvature is such that the strips almost touch the inner and outer cylinder walls 15, 14 of the housing, for example at two places. Sealing strips 49 have been inserted into corresponding grooves in the front faces of the strips 3a, 3b and the strips 45, 46. By means of these strips the working chambers are sealed toward the lateral walls of the housing and the positive displacement disk 2.

Figure 3:
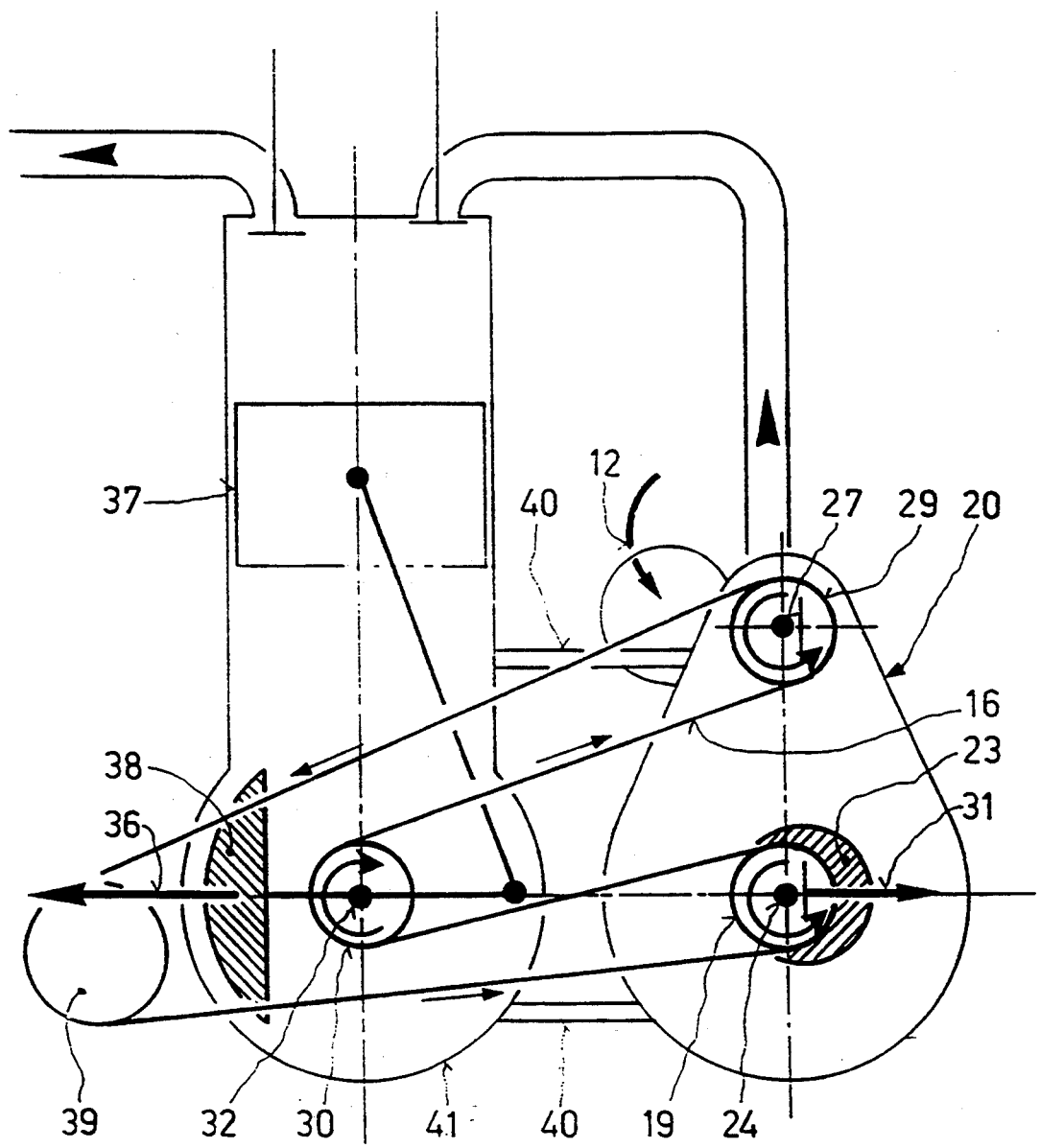
FIG. 3 is a schematic view of an internal combustion engine with the charger and the belt drive disposed in accordance with the invention.

The drive and guidance of the rotor 1 are provided by the two eccentric devices 23, 24 or 26, 27, disposed at a distance from each other. On the drive side the driveshaft 24 is seated in a bearing 17 and on the air side in a bearing 18. It is connected on its end extending from the housing half 7a with the drive pulley 19, which simultaneously is the synchronization pulley. The guide shaft 27 itself also extends from the housing half 7a and has a toothed belt 29 which is profiled to be identical to the pulley 19. To obtain a definite guidance of the rotor 1 in the dead center positions, the two eccentric devices are synchronized in an exact angular manner via a toothed belt drive 16. In accordance with the invention, the pulley 30 of the internal combustion engine is also tied in with this toothed belt drive (FIG. 3). The double eccentric drive located in the charger sees to it that all points of the rotor disk 2 and also all points of the two strips 3a, 3b perform a circular displacement movement. Because of the repeated alternating approaches of the strips 3a, 3b to the inner cylinder wall 15 and the outer cylinder wall 14 of the conveying chamber 11, sickle-shaped working chambers 35, which enclose the working medium, are formed on both sides of the strips, which are displaced in the direction toward the outlet 13 during the movement of the rotor disk through the conveying chamber. In the course of this the volumes of these working chambers are reduced and the pressure of the working medium is correspondingly increased.

The synchronous connection of the crankshaft 32 of the internal combustion engine via the pulley 30 with the eccentric shafts 24, 27 and via the pulleys 19, 29 with the toothed belt drive 16 of the spiral machine used as a charger permits an effect on the free forces of inertia of the internal combustion machine by the balancing centrifugal force 31 of the spiral machine since, in accordance with the invention, the driveshaft 24 has no counterweights for balancing the centrifugal forces caused by the eccentric movement of the eccentric disk 23 and the rotor 1 (FIGS. 2, 3). In a suitable manner synchronization takes place in that the free forces of inertia of the internal combustion engine and those of the realized spiral machine cancel each other out or at least have such an effect on each other that the resulting free forces/moments of inertia are reduced for the purpose of a low-vibration internal combustion engine operation.

The schematic view shown in FIG. 3 is used as an example and illustrates the case of a two-cylinder reciprocating internal combustion engine with parallel running pistons 37. The size of the balance weight 38 of the internal combustion engine is a compromise if no balancing shaft is used. In the dead center positions of the pistons 37, the balancing force generated by the balance weight 38 is too small, in the position of the pistons 37 shown in FIG. 3 it is too large.

This can be remedied if the spiral charger has a transmission ratio of exactly 1 between the crankshaft 32 of the internal combustion engine and the driveshaft 24 of the charger and its guide shaft 27, and if the angular position of the crankshaft 32 and the driveshaft 24 in the position of the pistons 37 illustrated in FIG. 3 is such that the balancing centrifugal force 36 of the crankshaft 32 and the balancing centrifugal force 31 of the driveshaft 24 embodied in accordance with the invention act oppositely. The consistent addition of the balancing centrifugal forces 31, 36 in the dead center positions of the pistons results from the reversal of the direction of rotation of the charger in respect to the internal combustion engine. (The rotor 1 is not shown in FIG. 3).

In the exemplary embodiment shown, the toothed belt drive 16 consists of a belt with a profiling which is identical on both sides. A tension roller 39 is shown, which can also drive an auxiliary component, not further identified. The connection between the charger housing 7a, 7b and the crank housing 41 of the internal combustion engine is identified by 40.

The transmission ratio between the crankshaft 32 of the internal combustion engine and the driveshaft 24 of the spiral machine is exactly 2 when the effect on or balancing of the second order free forces/moments of inertia of the internal combustion engine is concerned.

What is claimed is:

1. A reciprocating internal combustion engine with a mechanically-driven charger (20), the internal combustion engine having a number and disposition of cylinders such that free forces/moments of inertia are still provided, and wherein at least one shaft of the mechanical charger has at least one shaft which is disposed parallel to a crankshaft of the reciprocating internal combustion engine, comprising:

means for driving the mechanical charger (20) in an angle-synchronous manner with the crankshaft (32) of the reciprocating internal combustion engine, wherein the transmission ratio between the charger and the crankshaft is in whole numbers; and at least one shaft of the charger (20) has a balancing centrifugal weight which during operation counteracts the free forces of inertia of the reciprocating internal combustion engine for the purpose of a low-vibration or vibration-free operation of the internal combustion engine.

2. A reciprocating internal combustion engine in accordance with claim 1, wherein the mechanical charger is a spiral charger and wherein a driveshaft (24), an eccentric disk (23) and a rotor (1) of the charger constitutes the balancing centrifugal weight that acts against the free forces/moments of inertia of the reciprocating internal combustion engine.

3. A reciprocating internal combustion engine in accordance with claim 1, wherein the spiral charger has a driveshaft (24) and a guide shaft (27) which are both tied in with the crankshaft 32 of the reciprocating internal combustion engine into a synchronization belt drive (16).

* * * * *